(12) United States Patent
Makino et al.

(10) Patent No.: US 10,756,591 B2
(45) Date of Patent: *Aug. 25, 2020

(54) MOTOR

(71) Applicants: Nidec Corporation, Kyoto (JP);
NIDEC TAIWAN CORPORATION,
Jhongiheng District, Taipei (TW)

(72) Inventors: Yusuke Makino, Kyoto (JP); Yoshiki Kawai, Kyoto (JP); Keisuke Morita, Kyoto (JP); Guo Jhih Yan, Taipei (TW); Hsiu Ying Lin, Taipei (TW)

(73) Assignees: NIDEC CORPORATION, Kyoto (JP);
NIDEC TAIWAN CORPORATION, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,508

(22) Filed: Jul. 11, 2019

(65) Prior Publication Data

US 2019/0334402 A1    Oct. 31, 2019

Related U.S. Application Data

(63) Continuation of application No. 15/527,420, filed as application No. PCT/JP2015/081852 on Nov. 12, 2015, now Pat. No. 10,411,543.

(30) Foreign Application Priority Data

Nov. 17, 2014  (JP) ................................. 2014-233147

(51) Int. Cl.
*H02K 3/50* (2006.01)
*H02K 21/24* (2006.01)
(Continued)

(52) U.S. Cl.
CPC ................. *H02K 3/50* (2013.01); *H02K 1/14* (2013.01); *H02K 1/2793* (2013.01); *H02K 3/521* (2013.01);
(Continued)

(58) Field of Classification Search
CPC ............ H02K 1/27; H02K 16/02; H02K 3/52; H02K 1/14; H02K 21/24; H02K 3/521;
(Continued)

(56) References Cited

U.S. PATENT DOCUMENTS

| 7,569,958 B2 * | 8/2009 | Matsuzaki | ............. H02K 3/524 |
| | | | 310/43 |
| 2008/0191562 A1 * | 8/2008 | Kojima | .................. H02K 21/24 |
| | | | 310/43 |

(Continued)

OTHER PUBLICATIONS

Makino et al., "Motor", U.S. Appl. No. 15/527,420, filed May 17, 2017.

*Primary Examiner* — Tran N Nguyen
*Assistant Examiner* — Leda T Pham
(74) *Attorney, Agent, or Firm* — Keating & Bennett

(57) ABSTRACT

Provided is a motor including a shaft; two rotors attached to the shaft and spaced from each other in an axial direction by a predetermined distance; a stator arranged between the two rotors; a busbar unit arranged on one axial side of at least one of the two rotors, and arranged to hold a busbar; and a housing arranged to hold the stator and house the two rotors therein. The stator includes a plurality of cores arranged in a circumferential direction, and coils wound around the cores. A lead wire drawn out from the coils is arranged to extend, radially outside of the one of the rotors, from the corresponding core to a position on the one axial side of the one of the rotors, and is connected to the busbar at the position. The busbar unit is housed in the housing.

4 Claims, 6 Drawing Sheets

(51) Int. Cl.
*H02K 1/14* (2006.01)
*H02K 3/52* (2006.01)
*H02K 16/02* (2006.01)
*H02K 1/27* (2006.01)

(52) U.S. Cl.
CPC .............. *H02K 16/02* (2013.01); *H02K 21/24* (2013.01); *H02K 2201/15* (2013.01); *H02K 2203/09* (2013.01)

(58) Field of Classification Search
CPC .......... H02K 1/04; H02K 1/2793; H02K 3/50; H02K 2203/09; H02K 2201/15
See application file for complete search history.

(56) References Cited

U.S. PATENT DOCUMENTS

| | | | |
|---|---|---|---|
| 2012/0228972 A1* | 9/2012 | Moya ................. | H02K 1/148 310/71 |
| 2014/0113472 A1* | 4/2014 | Chamberlin ............ | H02K 3/50 439/212 |

* cited by examiner

MOTOR

BACKGROUND OF THE INVENTION

1. Field of the Invention

The present invention relates to a motor.

2. Description of the Related Art

As a thin high-power motor, an axial gap-type motor, in which one stator is arranged axially between two rotors arranged axially opposite to each other, is known (see JP-A 2008-125278).

SUMMARY OF THE INVENTION

Problems to be Solved by the Invention

In a known axial gap-type motor, lead wires of coils for each of phases wound around cores are typically connected on a radially outer side of a rotor. In this case, passage line handling portions in which passage lines are housed are arranged on the radially outer side of the rotor, and this makes it difficult to increase the outside diameter of the rotor. As a result, an area over which the rotor and a stator are opposed to each other becomes small. Meanwhile, if the outside diameter of the rotor is to be increased to increase the area over which the rotor and the stator are opposed to each other, the passage line handling portions need to be moved to positions on the radially outer side of a stator core. This will result in an increase in outside diameter of the motor as a whole. Moreover, when the passage lines are drawn on the radially outer side of the stator, wiring becomes complicated, making connection of the lead wires cumbersome.

An object of one embodiment of the present invention is to provide an axial gap-type motor which allows coil wires of a stator to be connected in a simple manner.

Solution to the Problems

According to one embodiment of the present invention, there is provided a motor including a shaft having a central axis extending in one direction as a center thereof; two rotors attached to the shaft and spaced from each other in an axial direction by a predetermined distance; a stator arranged between the two rotors; a busbar unit arranged on one axial side of at least one of the two rotors, and arranged to hold a busbar electrically connected to the stator; and a housing arranged to hold the stator and house the two rotors therein. The stator includes a plurality of cores arranged in a circumferential direction, and coils wound around the cores. A lead wire drawn out from the coils is arranged to extend, radially outside of the one of the rotors, from the corresponding core to a position on the one axial side of the one of the rotors, and is connected to the busbar at the position. The busbar unit is housed in the housing.

Advantages of the Invention

According to one embodiment of the present invention, there is provided an axial gap-type motor which allows coil wires of a stator to be connected in a simple manner.

DETAILED DESCRIPTION OF THE PREFERRED EMBODIMENTS

Figure 1:
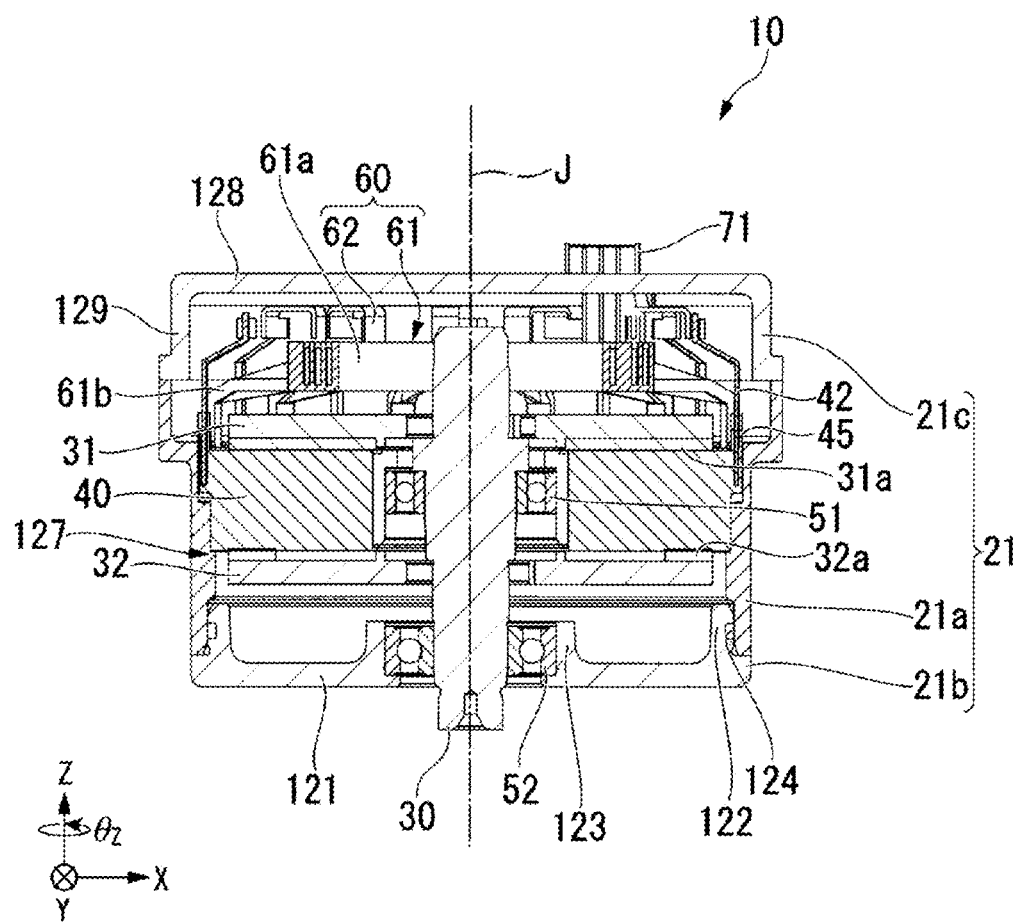
FIG. 1 is a sectional view of a motor according to an embodiment.

Hereinafter, embodiments of the present invention will be described with reference to the drawings. Note that the scope of the present invention is not limited to the embodiments described below, but includes any modification thereof within the scope of the technical idea of the present invention. Also note that scales, numbers, and so on of members or portions illustrated in the following drawings may differ from those of actual members or portions, for the sake of easier understanding of the members or portions.

In the drawings, an xyz coordinate system is shown appropriately as a three-dimensional orthogonal coordinate system. In the xyz coordinate system, a z-axis direction is assumed to be a direction parallel to an axial direction of a central axis J shown in FIG. 1 (i.e., one direction). An x-axis direction is assumed to be a direction perpendicular to a z-axis, and is assumed to be a left-right direction in FIG. 1 in the present embodiment. A y-axis direction is assumed to be a direction perpendicular to both the z-axis and an x-axis, and is assumed to be a depth direction in FIG. 1 in the present embodiment.

In the following description, a positive side (i.e., a +z side) in the z-axis direction will be referred to as a "rear side", and a negative side (i.e., a −z side) in the z-axis direction will be referred to as a "front side". It should be noted that the above definitions of the rear side and the front side are made simply for the sake of convenience in description, and are not meant to restrict actual relative positions or directions of different members or portions. In addition, unless otherwise specified, the direction parallel to the central axis J (i.e., the z-axis direction) will be simply referred to by the term "axial direction", "axial", or "axially", radial directions centered on the central axis J will be simply referred to by the term "radial direction", "radial", or "radially", and a circumferential direction centered on the central axis J, i.e., a circumferential direction about the central axis J (i.e., a $\theta_z$ direction), will be simply referred to by the term "circumferential direction", "circumferential", or "circumferentially".

It is assumed herein that the wording "to extend in the axial direction", "to extend axially", or the like as used herein includes not only to extend exactly in the axial direction (i.e., the z-axis direction) but also to extend in a direction at an angle of less than 45 degrees to the axial direction. It is also assumed herein that the wording "to extend in a radial direction", "to extend radially", or the like as used herein includes not only to extend exactly in a radial direction or exactly radially, that is, exactly in a direction or directions perpendicular to the axial direction (i.e., the z-axis direction), but also to extend in a direction or directions at an angle of less than 45 degrees to the radial direction(s).

Figure 2:
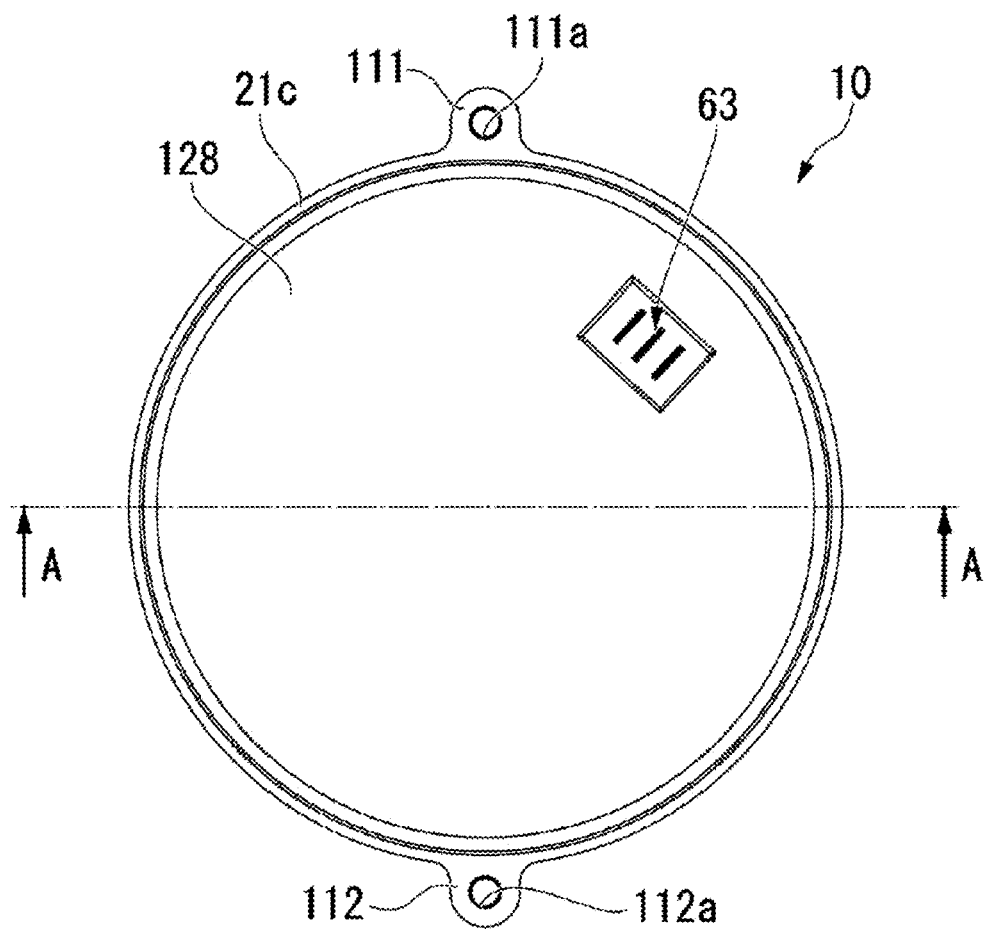
FIG. 2 is a plan view of the motor according to an embodiment.
Figure 3:
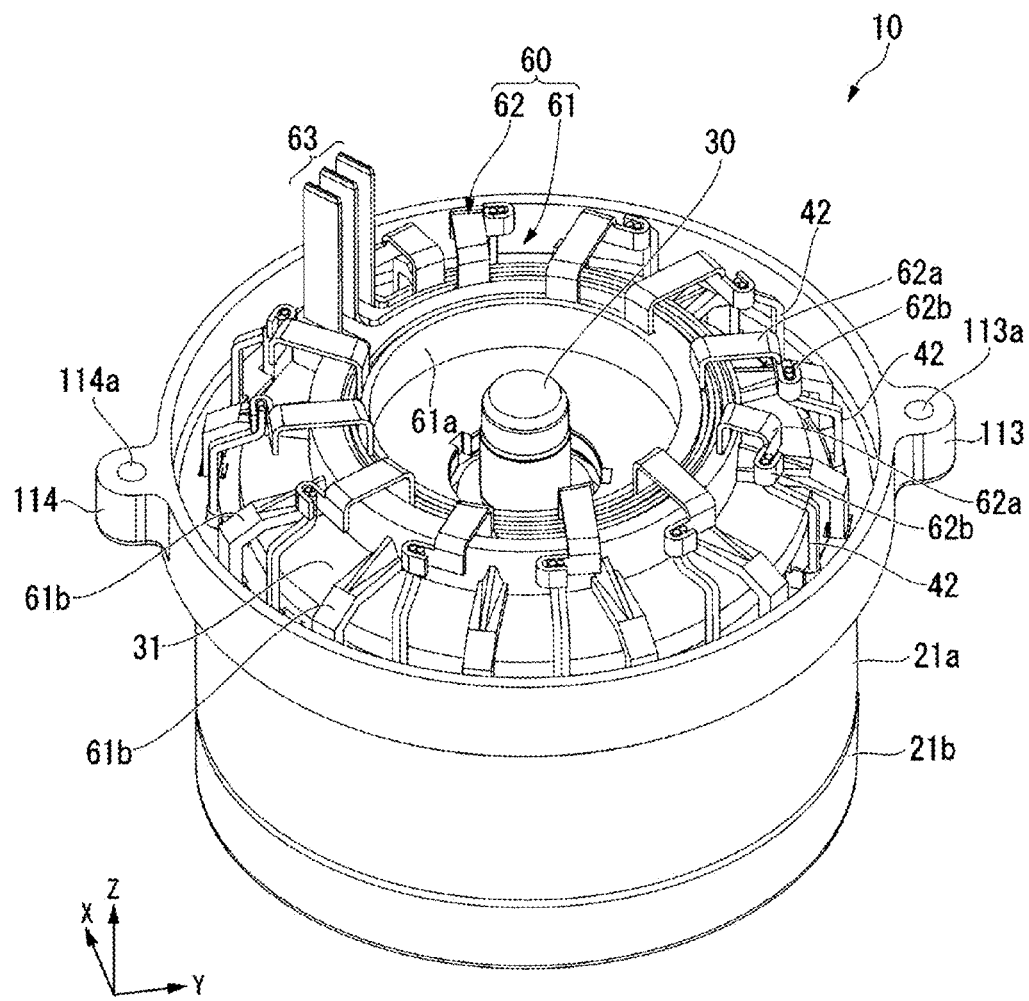
FIG. 3 is a perspective view illustrating an internal structure of the motor according to an embodiment.

FIG. 1 is a sectional view of a motor according to the present embodiment. FIG. 2 is a plan view of the motor according to the present embodiment. FIG. 3 is a perspective view illustrating an internal structure of the motor according to the present embodiment.

The motor 10 according to the present embodiment is an axial gap-type motor. As illustrated in FIG. 1, the motor 10 includes a housing 21, a shaft 30, a first rotor 31, a second rotor 32, a stator 40, a first bearing 51, a second bearing 52, a busbar unit 60, and a connector 71.

Each of the first rotor 31 and the second rotor 32 is arranged opposite to a separate one of surfaces of the stator 40 on both axial sides. The first rotor 31 and the second rotor 32 are fixed to the shaft 30 to be coaxial with each other. The shaft 30 is supported at two axial positions by the first bearing 51, which is held on an inner circumferential surface of the stator 40, and the second bearing 52, which is held on the front side (i.e., the −z side) of the second rotor 32.

The housing 21 defines a case of the motor 10 according to the present embodiment. The stator 40 is held on a portion of the housing 21 substantially in an axial middle of the housing 21. The first rotor 31 and the busbar unit 60 are housed on the rear side (i.e., the +z side) of the stator 40. The second rotor 32 is housed on the front side (i.e., the −z side) of the stator 40.

The housing 21 includes a first housing 21a, a second housing 21b, and a third housing 21c. The first housing 21a is in the shape of a cylinder opening at both axial ends. The second housing 21b is cylindrical and has a bottom, and is coupled to the first housing 21a on the front side (i.e., the −z side) of the first housing 21a. The third housing 21c is in the shape of a covered cylinder, and is coupled to the first housing 21a on the rear side (i.e., the +z side) of the first housing 21a. The housing 21 is made of, for example, a metal or a resin.

A plurality of shoulder portions are defined in an inner circumferential surface of the first housing 21a. The stator 40 is held on a shoulder portion 127 of the first housing 21a, the shoulder portion 127 being defined in an axial middle portion of the first housing 21a. The second housing 21b includes a disk-shaped bottom wall 121, a cylindrical portion 122 arranged to extend to the rear side (i.e., the +z side) from the bottom wall 121, and a bearing holding portion 123 arranged at a central portion of the bottom wall 121. The cylindrical portion 122 is fitted to an opening portion 124 of the first housing 21a on the front side (i.e., the −z side). The second bearing 52 is held by the bearing holding portion 123.

The third housing 21c includes a disk-shaped top wall 128 and a cylindrical portion 129 arranged to extend to the front side (i.e., the −z side) from an outer circumferential end of the top wall 128. An opening end of the cylindrical portion 129 on the front side (i.e., the −z side) is fixed to an opening end of the first housing 21a on the rear side (i.e., the +z side). In more detail, the first housing 21a and the third housing 21c are fixed to each other by, for example, bolting using flange portions 111 and 112 of the third housing 21c as illustrated in FIG. 2 and flange portions 113 and 114 of the first housing 21a as illustrated in FIG. 3.

The flange portions 111 to 114 include through holes 111a to 114a, respectively, each of which is arranged to pass through the corresponding flange portion in the axial direction. The flange portion 111 and the flange portion 113 are fastened to each other through, for example, a bolt inserted through the through holes 111a and 113a. The flange portion 112 and the flange portion 114 are fastened to each other through, for example, a bolt inserted through the through holes 112a and 114a.

The top wall 128 of the third housing 21c includes a through hole (not shown) arranged to pass therethrough in the axial direction. The connector 71 is attached inside the through hole. Three external connection terminals 63 (see FIG. 3), each of which is arranged to extend to the rear side (i.e., the +z side) from the busbar unit 60, which will be described below, are arranged in the connector 71. The external connection terminals 63 are arranged to pass through the top wall 128 in the axial direction.

Each of the first rotor 31 and the second rotor 32 is in the shape of a disk, extending radially. The first rotor 31 includes a plurality of magnets 31a arranged in the circumferential direction on a surface (i.e., a surface on the −z side) thereof axially opposed to the stator 40. The second rotor 32 includes a plurality of magnets 32a arranged in the circumferential direction on a surface (i.e., a surface on the +z side) thereof axially opposed to the stator 40.

Figure 4:
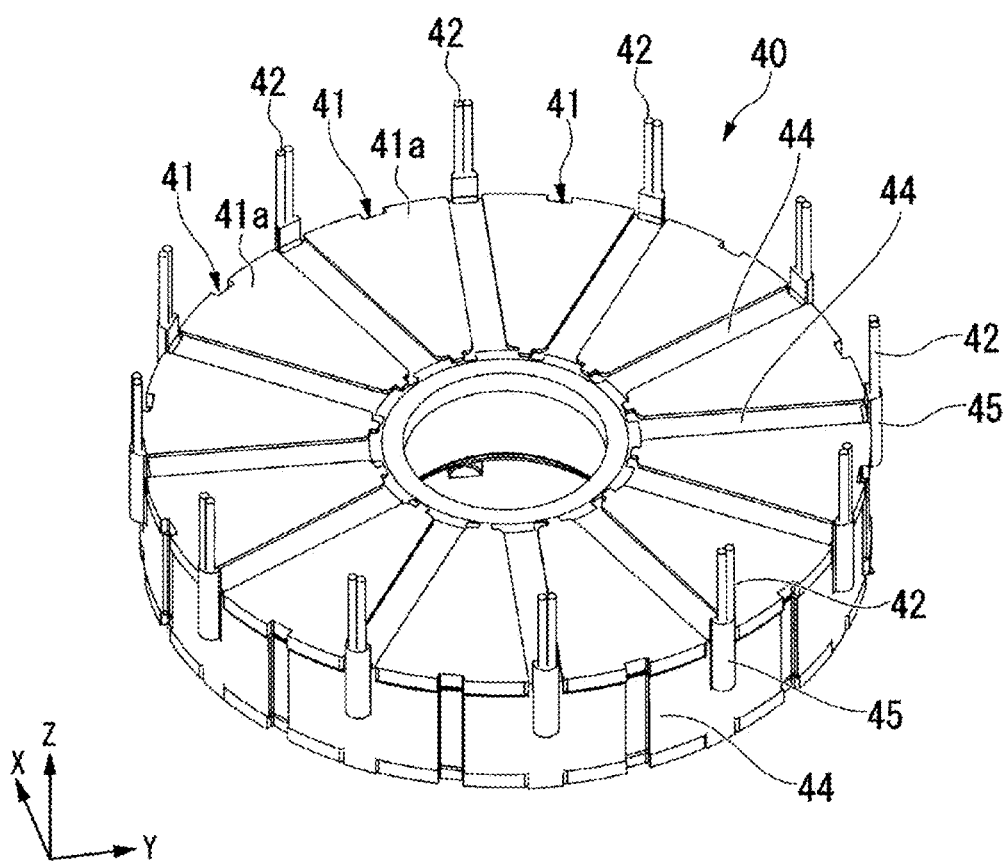
FIG. 4 is a perspective view of a stator thereof.
Figure 5:
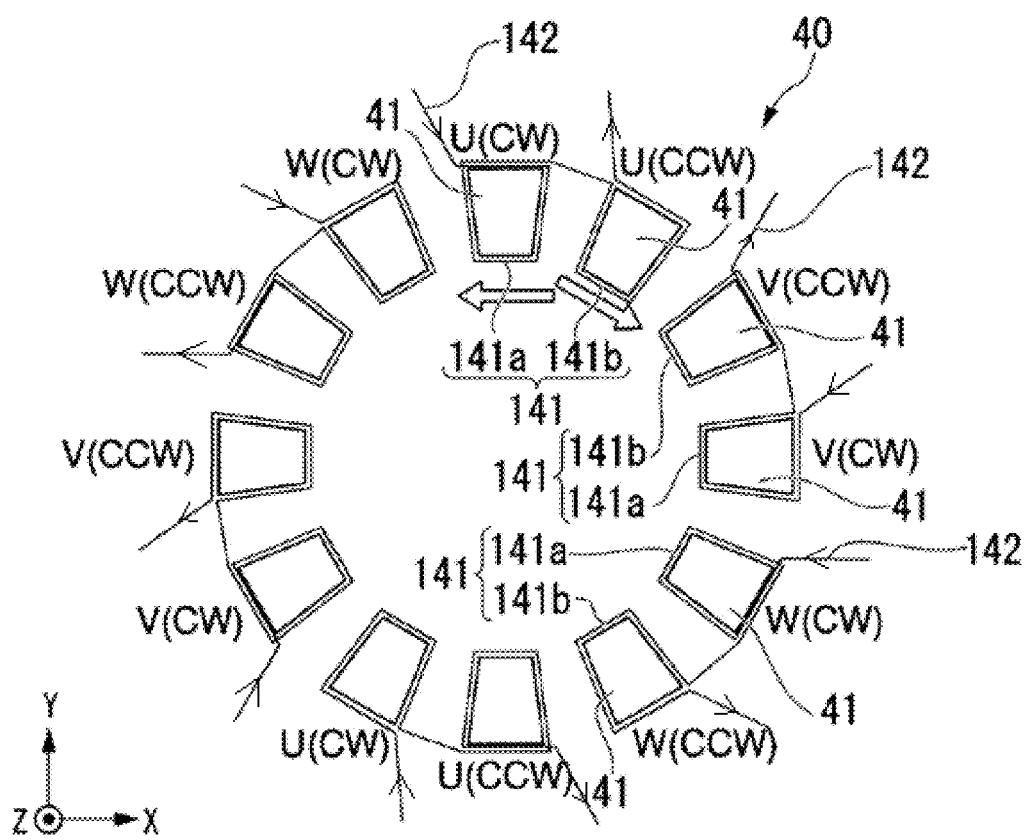
FIG. 5 is an explanatory diagram illustrating a winding pattern of coils of the stator.

FIG. 4 is a perspective view of the stator 40. FIG. 5 is an explanatory diagram illustrating a winding pattern of coils of the stator 40. The stator 40 includes a plurality of cores 41, the coils, coil lead wires 42, a molding resin 44, and lead wire support portions 45. The cores 41 are each in a fan shape in a plan view, and are arranged in the circumferential direction to assume the shape of a circular ring. The coils are wound around each of the cores 41. Note that they are not shown in FIG. 4. The coil lead wires 42 are drawn out in the axial direction from the coil of each core 41. The molding resin 44 is arranged to fasten the cores 41 to one another to form a unitary body. That is, the cores 41 are fixed to one another through the resin. Each lead wire support portion 45 is arranged at an outer circumferential end of the stator 40. Note that the number of coils and the number of lead wire support portions 45 are both twelve in FIG. 4, but may not necessarily be twelve in other embodiments of the present invention.

Each core 41 includes umbrella surfaces 41a which are not covered with the molding resin 44 in the surfaces of the stator 40 on both axial sides. A conducting wire is wound around side surfaces (i.e., surfaces extending along the z-axis) of each core 41 with an insulator (not shown) intervening therebetween to define the coil. As illustrated in FIG. 5, in the present embodiment, two coils 141a and 141b are continuously wound with a single conducting wire 142 to define a coil pair 141. Six of such coil pairs 141 are arranged in the circumferential direction in the stator 40 as a whole.

The stator 40 includes a three-phase circuit. Each of a U phase, a V phase, and a W phase has two of the coil pairs 141. As illustrated in FIG. 5, each of the coil pairs 141 of each phase includes the coil 141a, in which the conducting wire 142 is wound in a clockwise (CW) direction when viewed from the rear side (i.e., the +z side), and the coil 141b, in which the conducting wire 142 is wound in a counterclockwise (CCW) direction when viewed from the rear side (i.e., the +z side). The coils 141a and 141b of each of the coil pairs 141 of each phase are arranged circumferentially adjacent to each other in the stator 40.

In the winding pattern described above, the number of cores is twelve, and therefore, the number of magnets of each of the first rotor 31 and the second rotor 32 may be arranged to be, for example, ten, making a 10P12S (i.e., ten poles and twelve slots) structure, to minimize cogging torque. In addition, since two of the cores 41 for the same phase are arranged adjacent to each other, a counter-electromotive force can be maximized, and further, a passage line therebetween can be shortened. This leads to improved motor efficiency. In addition, in a process of winding the coils 141*a* and 141*b* around the two cores 41 coupled to each other through the passage line, the conducting wire 142 can be wound in a single direction, which leads to increased efficiency in manufacturing.

In the present embodiment, both ends of the conducting wire 142 are drawn out from the cores 41 from the coils 141*a* and 141*b*, respectively. Therefore, as illustrated in FIG. 4, the number of coil lead wires 42 led out from the cores 41 is twelve, which is equal to the number of cores 41. At the outer circumferential end of the stator 40, the lead wire support portions 45, each of which is columnar and is arranged to extend in the axial direction, are arranged on a radially outer side of a boundary between every adjacent ones of the cores 41. In the present embodiment, each lead wire support portion 45 is defined as a portion of the molding resin 44. That is, the stator 40 includes the lead wire support portions 45 each of which is defined as a portion of the molding resin 44 at an outer circumferential portion of the stator 40 radially outside of the first rotor 31. Accordingly, each lead wire support portion 45 is radially opposed to the first rotor 31. Each lead wire support portion 45 is arranged to cover a portion of the corresponding coil lead wire 42.

Each lead wire support portion 45 is arranged to extend to the rear side (i.e., the +z side) from an outer circumferential surface of the stator 40. A portion of the lead wire support portion 45 is arranged to protrude to the rear side (i.e., the +z side) relative to the umbrella surfaces 41*a*. Each coil lead wire 42 is arranged to pass through the corresponding lead wire support portion 45 from the corresponding core 41, and extend in the axial direction from an end of the corresponding lead wire support portion 45 on the rear side (i.e., the +z side). That is, each coil lead wire 42 is led out in the axial direction from the corresponding core 41 through the corresponding lead wire support portion 45.

As illustrated in FIGS. 1 and 3, the busbar unit 60 includes a busbar holder 61, busbars 62, which are held by the busbar holder 61, and the external connection terminals 63, which are arranged to extend to the rear side (i.e., the +z side) from the busbars 62. The busbar holder 61 is made of an insulating resin material. Each busbar 62 is defined by a metal member, e.g., a strip-shaped copper plate, bent into a predetermined shape.

The busbar holder 61 includes a body portion 61*a* in the shape of a circular ring and arranged on the rear side (i.e., the +z side) of the first rotor 31, and a plurality of holder support portions 61*b* arranged to extend radially from an outer circumferential surface of the body portion 61*a* in a radial manner. The body portion 61*a* is arranged to have an outside diameter smaller than an outside diameter (i.e., a diameter) of the first rotor 31.

The number of holder support portions 61*b* is twelve in the present embodiment. Each holder support portion 61*b* is a leg portion which is substantially in the shape of the letter "L" in a side view. The holder support portion 61*b* is arranged to extend radially outward from the body portion 61*a*, is bent to the front side (i.e., the −z side) on the radially outer side of the first rotor 31, and is attached to the stator 40 on the radially outer side of the first rotor 31. Therefore, the busbar holder 61 is supported by the stator 40 through the holder support portions 61*b* between the first rotor 31 and the top wall 128 of the third housing 21*c*.

The busbars 62 are connected to the coil lead wires 42, which extend to the rear side (i.e., the +z side) from the lead wire support portions 45 of the stator 40. The busbars 62 are arranged to connect wires for the U phase, the V phase, and the W phase, among the coil lead wires 42, to the corresponding external connection terminals 63. In addition, the busbars 62 are arranged to connect wires for a neutral point, among the coil lead wires 42, to each other. That is, the coils 141*a* and 141*b* can be connected in a delta configuration through the busbars 62. Therefore, the busbars 62 include four metal members each of which is arranged for a separate one of the U phase, the V phase, the W phase, and the neutral point.

The busbars 62 include twelve coil connection portions 62*a*, which are arranged to extend radially outward from the body portion 61*a* of the busbar holder 61 in a radial manner, and hook-shaped lead wire holding portions 62*b*, which are arranged at ends of the coil connection portions 62*a*. The lead wire holding portions 62*b* are arranged radially inward of an outer circumferential end of the first rotor 31.

In the present embodiment, each coil lead wire 42 is arranged to extend to the rear side (i.e., the +z side) from the outer circumferential portion of the stator 40 radially outside of the first rotor 31, and is bent radially inward at a position on the rear side of the first rotor 31. Each coil lead wire 42 is connected to the corresponding lead wire holding portion 62*b* on an axially upper side of the first rotor 31.

In the motor 10 according to the present embodiment, which has the above-described structure, the busbars 62 are housed inside of the housing 21. This allows the coil lead wires 42 of the stator 40 to be drawn in the axial direction to be connected to the busbars 62 to accomplish wiring. This eliminates the need to draw the coil lead wires 42 radially outward from the cores 41, and thus, the wiring can be simplified, and connection of the coil lead wires can be easily accomplished. In addition, since the busbar unit 60 is arranged on one axial side of the first rotor 31, the connection of the coil lead wires 42 can be performed in a region radially inward of the outer circumferential end of the stator 40, which contributes to preventing an increase in radial dimension of the motor 10.

In addition, in the present embodiment, the lead wire support portions 45, each of which is made of an insulating resin, are arranged radially outside of the first rotor 31. This contributes to preventing a contact between the outer circumferential end of the first rotor 31 and each coil lead wire 42, and contributes to preventing an occurrence of a short circuit, a broken wire, vibration, or the like.

In particular, in the present embodiment, the end of each lead wire support portion 45 on the rear side (i.e., the +z side) protrudes to the rear side relative to the first rotor 31 as illustrated in FIG. 1, and thus, an outer circumferential surface of the first rotor 31 is not radially opposed to any coil lead wire 42 in a direct manner. This contributes to more securely preventing a contact between the first rotor 31 and each coil lead wire 42. In addition, even when each coil lead wire 42 is bent radially inward, the lead wire support portion 45 contributes to preventing a contact between the first rotor 31 and the coil lead wire 42. Further, arranging each coil lead wire 42 to extend radially inward enables the coil lead wire 42 to be connected to the corresponding busbar 62 in a region radially inward of the outer circumferential end of the first rotor 31, which allows the busbar 62 to have a reduced diameter. That is, each coil lead wire 42 is connected to the corresponding busbar 62 at a position radially inward of the corresponding lead wire support portion 45.

Note that, although each lead wire support portion 45 is defined as a portion of the molding resin 44 in the present embodiment described above, this feature is not essential to the present invention. For example, an insulating member separate from the molding resin 44 may alternatively be arranged as each lead wire support portion 45. In this case, the insulating member is arranged radially outside of the first rotor 31. More specifically, the above insulating member may be defined by an insulating resin or rubber arranged to cover a portion of the corresponding coil lead wire 42 led out from the molding resin 44. Alternatively, as the above insulating member, a pipe made of an insulating resin or rubber may be attached to each coil lead wire 42.

Also, a portion of an insulator attached to each core 41 may alternatively define the lead wire support portion 45, for example. In this case, the stator 40 includes the insulator attached to the core. Specifically, a portion of the insulator is arranged to extend in the shape of a column in the axial direction from a vicinity of an outer circumferential end of the core 41, and this portion extending in the shape of a column is arranged to support the coil lead wire 42 on the radially outer side thereof. With the above arrangement, a portion of the insulator is arranged to intervene between the coil lead wire 42 and the first rotor 31, which contributes to preventing a contact between the coil lead wire 42 and the first rotor 31. That is, it may be sufficient if the stator 40 includes the lead wire support portions 45 each of which is defined by an insulating member arranged to cover at least a portion of the corresponding coil lead wire 42 at the outer circumferential portion of the stator 40 radially outside of the first rotor 31. Alternatively, the stator 40 may include the lead wire support portions 45 each of which is defined as a portion of the insulator.

Also note that, although each lead wire support portion 45 is arranged at the outer circumferential end of the stator 40 in the present embodiment, the lead wire support portion 45 may alternatively be arranged radially inward of the outer circumferential end of the stator 40. That is, each lead wire support portion 45 is arranged at a boundary between circumferentially adjacent ones of the cores 41 or at the outer circumferential end of the stator 40 on the radially outer side of the boundary. In this case, the lead wire support portion 45 can be easily arranged at the boundary between the adjacent cores 41, because the molding resin 44 is arranged at the boundary between the adjacent cores 41. Arranging the lead wire support portions 45 at the outer circumferential end of the stator 40 or radially inward thereof leads to a reduction in the number of members which protrude on the radially outer side of the stator 40, and contributes to preventing an increase in radial dimension of the stator 40 and of the motor 10.

Also note that, although one of the coil lead wires 42 is drawn out from each of the cores 41 in the present embodiment, the number of coil lead wires 42 may be changed appropriately in accordance with the manner of winding of the coils and the number of slots. Also note that the number of coil connection portions 62a of the busbars 62 may also be changed in accordance with the number of coil lead wires 42. Note that the coils 141a and 141b may alternatively be connected in a star configuration through the busbars 62.

Figure 6:
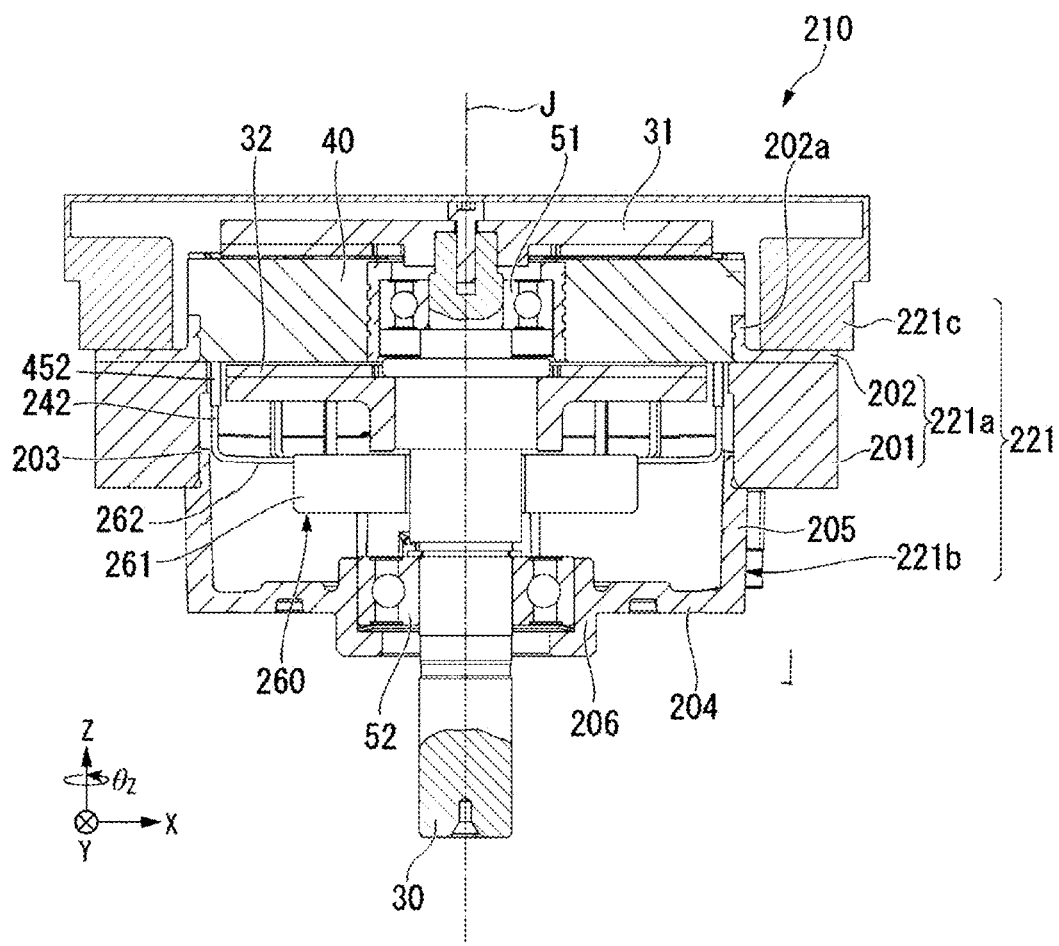
FIG. 6 is a sectional view illustrating a motor according to an example modification.

(Example Modifications) FIG. 6 is a sectional view illustrating a motor according to an example modification. Note that members or portions that have their equivalents in the above-described embodiment are denoted appropriately by the same reference numerals as those of their equivalents in the above-described embodiment, for example, and descriptions of such members or portions may be omitted.

As illustrated in FIG. 6, the motor 210 according to the example modification includes a housing 221, and a first rotor 31, a second rotor 32, a stator 40, a busbar unit 260, a first bearing 51, and a second bearing 52, which are housed in the housing 221.

The housing 221 includes a first housing 221a arranged to hold the stator 40, a second housing 221b coupled to the first housing 221a on the front side (i.e., the −z side) of the first housing 221a, and a third housing 221c fixed to the first housing 221a on the rear side (i.e., the +z side) of the first housing 221a. The second rotor 32 and the busbar unit 260 are housed between the stator 40 and the second housing 221b. The first rotor 31 is housed between the stator 40 and the third housing 221c. A shaft 30 is supported by the first bearing 51, which is fixed to an inner circumference of the stator 40, and the second bearing 52, which is held by the second housing 221b.

The first housing 221a is in the shape of a cylinder opening at both axial ends. The first housing 221a includes a cylindrical body portion 201 and a stator support portion 202 in the shape of the letter "L" in a section and fixed to a surface of the body portion 201 on the rear side (i.e., the +z side). The stator support portion 202 is in the shape of a circular ring. The stator support portion 202 is arranged to support an outer circumferential surface of the stator 40 with a cylindrical tubular portion 202a thereof.

The second housing 221b is cylindrical and has a bottom, and includes a bottom wall portion 204 in the shape of a circular ring, a tubular portion 205 arranged to extend to the rear side (i.e., the +z side) from an outer circumferential end of the bottom wall portion 204, and a bearing holding portion 206 arranged at a center of the bottom wall portion 204. An end portion of the tubular portion 205 of the second housing 221b on the rear side (i.e., the +z side) is fitted to an opening portion 203 of the body portion 201 on the front side (i.e., the −z side). The third housing 221c is in the shape of a covered cylinder, and is fixed to a surface of the stator support portion 202 of the first housing 221a on the rear side (i.e., the +z side) by, for example, bolting or the like.

The busbar unit 260 includes a busbar holder 261 in the shape of a circular ring and arranged to extend in the circumferential direction to surround the shaft 30, and busbars 262 supported by the busbar holder 261. The busbars 262 are arranged to extend radially outward from the busbar holder 261 in a radial manner, and are electrically connected to coil lead wires 42 arranged to extend in the axial direction from surfaces of cores 41 on the front side (i.e., the −z side).

Ends of lead wire support portions 452 on the front side (i.e., the −z side) are arranged to protrude to the front side relative to the second rotor 32, and therefore, the second rotor 32 is not radially opposed to any coil lead wire 42 in a direct manner. Each lead wire support portion 452 is radially opposed to the second rotor 32.

In the motor 210 according to the example modification, which has the above-described structure, the busbar unit 260 is housed in the second housing 221b on the front side (i.e., the −z side), and the second bearing 52 is arranged on the front side (i.e., the −z side) of the busbar unit 260. Even with the above structure, advantageous effects similar to those of the above-described embodiment can be achieved.

That is, the present invention is not limited to embodiments in which lead wires drawn out from coils are arranged to extend to the side of the first rotor 31 (i.e., the +z side) and are connected to busbars. In some embodiments, lead wires drawn out from coils may be arranged to extend to the side of the second rotor 32 (i.e., the −z side) and be connected to busbars, as in the above example modification. In other words, it is sufficient if the lead wires drawn out from the coils are arranged to extend, radially outside of one of the rotors, from cores to positions on one axial side of the one of the rotors, and are connected to the busbars at the positions. In addition, one end of each lead wire support portion is arranged to protrude relative to the rotor arranged on the one axial side. Specifically, an end portion of each lead wire support portion on the one axial side is arranged on the one axial side of a surface of the rotor on the one axial side. In addition, each lead wire support portion is radially opposed to the rotor on the one axial side.

What is claimed is:

1. A motor comprising:
    a shaft having a central axis extending in one direction as a center thereof;
    two rotors attached to the shaft and spaced from each other in an axial direction by a predetermined distance;
    a stator arranged between the two rotors;
    a housing arranged to hold the stator and house the two rotors therein; wherein
    the stator includes a plurality of cores arranged in a circumferential direction, and coils wound around the cores;
 a lead wire drawn out from the coils is arranged to extend, radially outside of the at least one of the two rotors, from the corresponding core to a position on the one axial side of the at least one of the two rotors;
    the stator includes a lead wire support portion radially opposed to the at least one of the two rotors, and the lead wire is led out in the axial direction from the corresponding core through the lead wire support portion;
    an end portion of the lead wire support portion on the one axial side is arranged on an axial surface of the at least one of the two rotors facing the one axial side;
    the cores are fixed to one another through a resin; and
    the lead wire support portion is defined as a portion of the resin at an outer circumferential portion of the stator radially outside of and opposed to the at least one of the two rotors on the one axial side.

2. The motor according to claim 1, wherein the lead wire support portion is arranged at a boundary between circumferentially adjacent ones of the cores or at an outer circumferential end of the stator on a radially outer side of the boundary.

3. A motor comprising:
    a shaft having a central axis extending in one direction as a center thereof;
    two rotors attached to the shaft and spaced from each other in an axial direction by a predetermined distance;
    a stator arranged between the two rotors;
    a housing arranged to hold the stator and house the two rotors therein; wherein
    the stator includes a plurality of cores arranged in a circumferential direction, and coils wound around the cores;
 a lead wire drawn out from the coils is arranged to extend, radially outside of the at least one of the two rotors, from the corresponding core to a position on the one axial side of the at least one of the two rotors;
    the stator includes a lead wire support portion radially opposed to the at least one of the two rotors, and the lead wire is led out in the axial direction from the corresponding core through the lead wire support portion;
    an end portion of the lead wire support portion on the one axial side is arranged on an axial surface of the at least one of the two rotors facing the one axial side;
    the cores are fixed to one another through a resin; and the lead wire support portion is defined by an insulating member arranged to cover at least a portion of the lead wire at an outer circumferential portion of the stator radially outside of the rotor on the one axial side.

4. A motor according to claim 1, further comprising:
    a conducting wire wound around side surfaces of each of the plurality of cores; and
    an insulator intervening between the conducting wire and the side surfaces of each of the plurality of cores.

* * * * *